H. W. PLEISTER.
CONDUIT OR CABLE CLAMP AND BRIDLE RING.
APPLICATION FILED DEC. 1, 1920.

1,381,238.

Patented June 14, 1921.

UNITED STATES PATENT OFFICE.

HENRY W. PLEISTER, OF WESTFIELD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,238.     Specification of Letters Patent.    Patented June 14, 1921.

Original application filed August 17, 1920, Serial No. 404,169. Divided and this application filed December 1, 1920. Serial No. 427,575.

*To all whom it may concern:*

Be it known that I, HENRY W. PLEISTER, a citizen of the United States, residing at Westfield, in the county of Union and State of New Jersey, have made certain new and useful Improvements in Conduit or Cable Clamps and Bridle-Rings, of which the following is a specification, taken in connection with the accompanying drawings.

This application is a division of my copending application for conduit or cable clamp and bridle ring, filed Aug. 17, 1920, Ser. No. 404,169.

My invention relates to a conduit or cable clamp and more particularly to one formed from wire. It further relates to such a wire conduit or cable clamp having an integral bridle ring formed on one arm of the base of the clamp. My invention further relates to the combination of such a combined wire conduit or cable clamp and bridle ring and a saddle to secure it to a wall or other suitable support.

In the figures, in which I have shown one embodiment of my invention, the same reference numerals refer to similar parts in the several figures.

Figure 1:
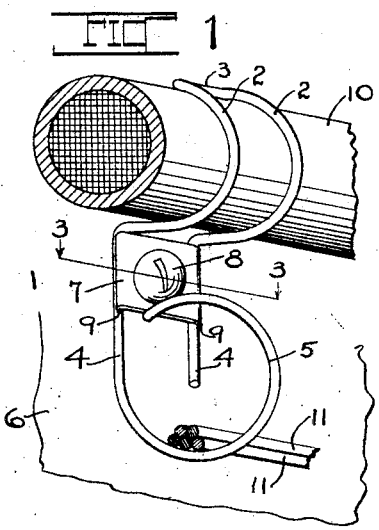
Figure 1 is a perspective view of my combined wire conduit or cable clamp, cable supported and one form of bridle ring with runs of bridle wires.

Prior to my invention it has been customary to support the heavy lead covered conduits or cables 10 by means of cable clamps formed from heavy castings of iron or similar metal, and also by cable clamps formed from pressed sheet steel. By my invention I form a much cheaper conduit or cable clamp which will do the heavy duty required to support the heavy lead covered cables and which will not bend or break under the heavy normal strains, nor will it fail under abnormal strains due to sleet, wind and ice. In such cast or pressed steel cable clamps it is customary to add to them separate bridle rings to string runs of bridle wires.

In my invention I form a combined wire conduit or cable clamp and bridle ring 1 by bending the wire back on itself to form the wire hooks 2, 2 and connecting portion 3. The ends of the wire are then bent to form arms 4, 4 the said arms forming the base of the clamp.

Figure 2:
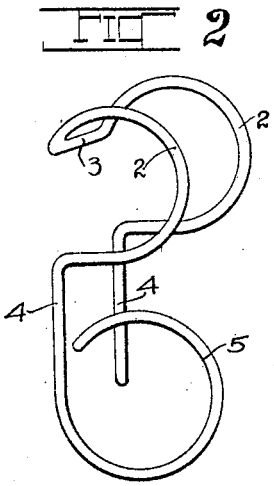
Fig. 2 is a detail perspective view of the form of combined wire clamp and bridle ring shown in Fig. 1.

In Figs. 1 and 2 one of the arms 4 is extended and bent back on itself to form the open bridle ring 5.

Figure 3:
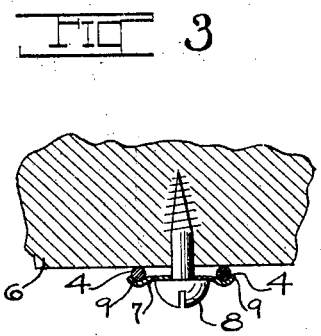
Fig. 3 is a horizontal section on line 3—3 of Fig. 1, looking down in the direction of the arrows.
Figure 4:
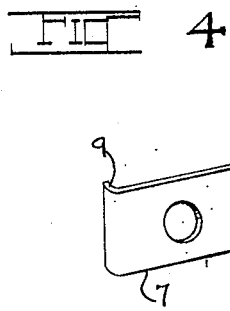
Fig. 4 is a perspective view of a saddle.

The cable 10, usually extremely heavy and lead covered, is supported on the wall or other suitable support 6 by the conduit or cable clamp 1, the saddle 7 and the securing screw 8. This saddle is preferably provided with curved ends 9, 9 which take over the wire arms 4, 4 and prevent their lateral displacement, see Fig. 3.

In my invention the bridle ring is mounted as soon as is the cable. The runs of bridle wires 11, 11 can then be strung through the bridle ring. Generally these bridle wires are not mounted until it is necessary to increase the capacity of the installation. When that need arises these bridle wires can be immediately supported without the lineman adding any additional mechanical supporting means to the wire conduit or cable clamp.

Having thus described this invention in connection with an illustrative embodiment thereof, to the details of which I do not desire to be limited, what is claimed as new and what is desired to secure by Letters Patent is set forth in the appended claim.

What I claim is:—

A new article of manufacture comprising a wire conduit or cable clamp having a plurality of wire hooks to support a cable and a plurality of arms to form a base, one of the arms being extended to form a complete bridle ring.

HENRY W. PLEISTER.

Witnesses:
  MARY R. RYAN,
  H. M. WILLIAMS.